Patented May 20, 1941

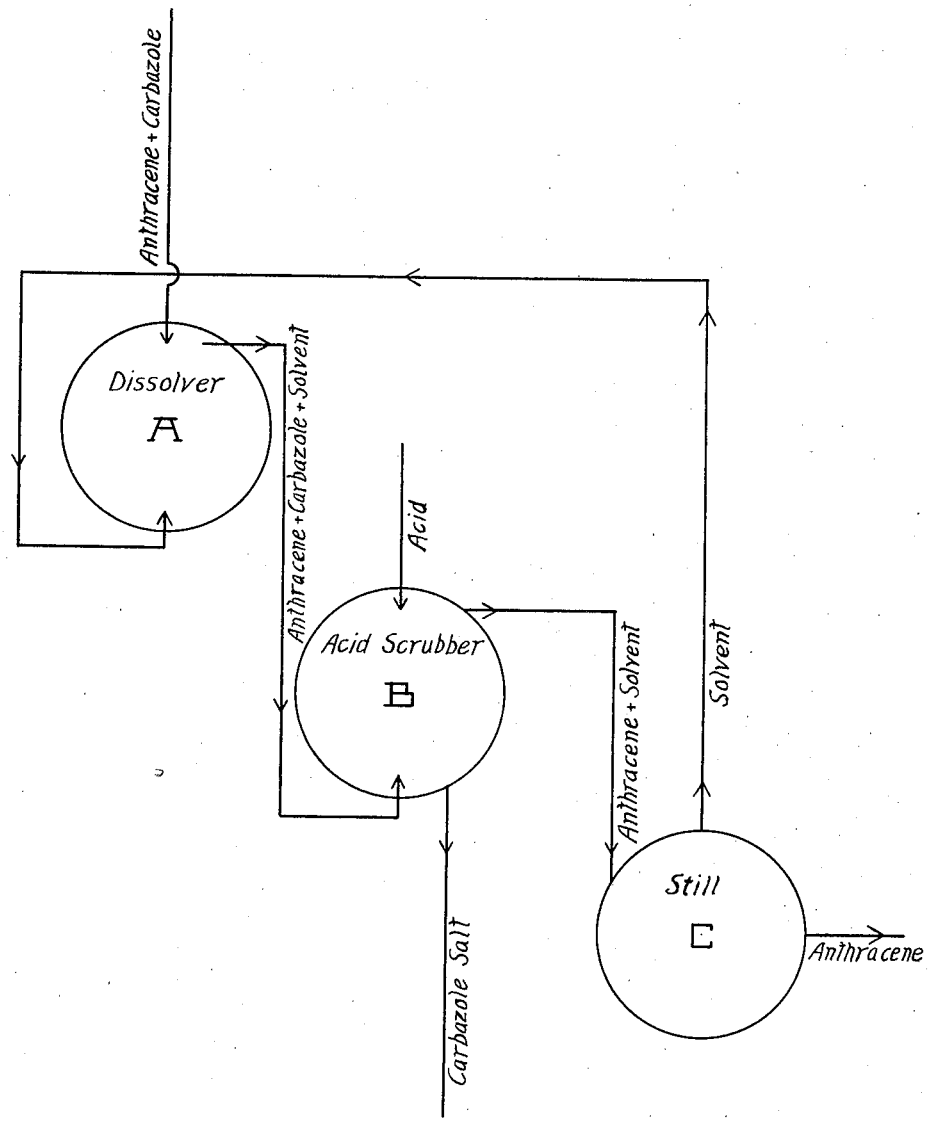

2,242,842

UNITED STATES PATENT OFFICE 2,242,842

SEPARATION OF CARBAZOLE

Viktor M. Weinmayr, Pitman, N. J., assignor to E. I. du Pont de Nemours & Company, Wilmington, Del., a corporation of Delaware Application April 5, 1938, Serial No. 200,281

5 Claims. (Cl. 260—318)

This invention relates to a process for the purification of crude anthracene. More particularly it relates to a method of separating carbazole and anthracene from a mixture thereof, and still more particularly to a continuous process for extracting carbazole from solvent solutions of crude anthracene by means of sulphuric acid.

Crude anthracene, as obtained from the distillation of coal tar, contains a large percentage of carbazole, and since there has not been developed as yet an economical method for oxidizing crude anthracene containing considerable amounts of carbazole, to pure anthraquinone it is evident that the presence of such carbazole is detrimental to the use of crude anthracene for the production of anthraquinone. Likewise the presence of anthracene in carbazole seriously diminishes its field of usefulness and especially as an intermediate in the manufacture of dyestuffs. The importance of obtaining substantially carbazole-free anthracene and anthracene-free carbazole is therefore obvious, and considerable work has been done to accomplish this, as can be seen from the existing literature.

Methods of separation of carbazole from anthracene heretofore known to the art may be divided into two classes, namely (1) separation by means of selective solvents, and (2) separation by means of chemical actions that change the chemical and physical character of the carbazole. Prominent among the first class of methods is the crystallization of crude anthracene from high boiling pyridines and other solvents having a selective solvent power for carbazole and anthracene. The outstanding example of the second method is the conversion of carbazole to potassium carbazolate either by fusion of crude anthracene with potassium hydroxide or by heating a solvent solution of crude anthracene in the presence of potassium hydroxide. These methods all involve the use of expensive solvents and/or reagents, which is of course a distinct economic disadvantage.

To overcome this advantage it has been proposed in German Patent 164,508 that relatively inexpensive sulphuric acid be used to convert carbazole into an organic solvent-insoluble carbazole sulphate which is easily isolated. However, experience has shown (see, for example, the disclosure of U. S. Patent 1,301,796) that under the conditions specified in this proposal, sulphonation of anthracene and solvent takes place to such an extent that the method is rendered unsuitable for the purification of anthracene.

An object of this invention is to provide a process for the separation of carbazole from anthracene, which process is free from the disadvantages which characterize the processes heretofore known. A further object is to provide a process for the extraction of carbazole from crude anthracene using an inorganic acid extractant, preferably sulphuric acid. A still further object is to provide a continuous process for the separation of carbazole from crude anthracene, using sulphuric acid as an extractant for the carbazole. These and other objects will more clearly appear in the description which follows.

It was found that in using sulphuric acid, sulphonation could be prevented without impairing the affinity of the acid for carbazole, by properly choosing the strength of sulphuric acid, the temperature of the operation, and the type of solvent. Still, even this improvement, important as it is to make the process workable is not sufficient to make it practical. Extraction of carbazole with sulphuric acid is most effective when substantially all of the crude anthracene is in solution in a solvent, and the solubility of crude anthracene in solvents suitable for the sulphuric acid process is very low at temperatures at which sulphonation of anthracene does not take place, being somewhere in the neighborhood of 2–4%. To purify crude anthracene by this method in quantities sufficient for the demand of the dyestuff industry would therefore mean the erection of a huge plant and the investment necessary would nullify all of the inherent economies of the process, such as the use of cheap solvents in place of expensive pyridine, and cheap sulphuric acid in place of expensive potassium hydroxide.

It was found further, however, that by suitably arranging the equipment so as to carry out the operation in a continuous fashion, a relatively small plant is required and a process is provided which requires a minimum of supervision.

Thus, the objects of my invention are accomplished by continuously bringing crude anthracene containing carbazole into solution in a suitable solvent such as benzene; continuously passing the solution through a body of sulphuric acid maintained at a concentration and at a temperature at which sulphonation of anthracene and solvent will not take place, whereby the extraction of carbazole is effected; and continuously treating the carbazole-free anthracene for separate recovery of anthracene and solvent. The latter is preferably returned to the initial stage of the process for reuse.

As the sulphuric acid becomes saturated with carbazole sulphate, it can be drawn off and replaced or replenished with fresh acid at any time without interrupting the continuous process. I have observed that the carbazole sulphate crystallizes out from the sulphuric acid when it reaches a concentration of 2–5%. By pumping the sulphuric acid through suitable filters it can be removed continuously without interrupting the process and a carbazole of very high purity can be obtained when the carbazole sulphate is decomposed with water.

The invention is best described by the following example, reference being had to the drawing wherein is shown schematically, one arrangement of equipment suitable for carrying out the invention.

*Example*

The dissolver A (volume about 1000 parts) is initially charged with 600 parts of crude anthracene, containing 50.8% anthracene, 22% carbazole and 27.2% phenanthrene or other non-nitrogen containing impurities, and benzene is added to fill the vessel. The acid scrubber B (volume about 3500 parts) is charged with 3000 parts of 85% sulphuric acid, and filled with benzene. The still C (volume about 3000 parts) is charged about two-thirds full with benzene. The volumes given for the different vessels are mainly illustrative and depend, of course, primarily upon the design of the plant.

The contents of vessels A and B are slowly agitated and vessel C is heated to start the distillation of the benzene. The benzene is condensed and passes into vessel A which is maintained at 20°–30° C. As it passes through the crude anthracene it becomes saturated with it and contains then from 2–4% of crude anthracene. This saturated benzene solution enters vessel B and passes through the sulphuric acid layer which is maintained at 20°–30° C. The carbazole contained in the benzene solution is extracted by the sulphuric acid and the carbazole-free anthracene passes on to still C where it accumulates. The speed of the operation depends of course upon the efficiency of the sulphuric acid scrubbers. The anthracene accumulating in the still is drawn off and more crude anthracene is charged into the dissolver without interrupting the purification. The amount of sulphuric acid given is sufficient for the purification of many times more than 600 parts of crude anthracene. Carbazole sulphate begins to precipitate from this acid in readily filterable crystals when a concentration of about 2–5% of carbazole is reached. This carbazole sulphate is drawn off and may be filtered and the acid, possibly together with fresh acid, be returned to the acid scrubbers without interrupting the purification process. The contents of vessel C are isolated by distilling off the benzene, and at least 95% of the anthracene content of the crude anthracene that was charged into vessel A is thus obtained as 76.3% anthracene containing 1.4% carbazole.

Anthraquinone of a melting range of 284°–286° C. is obtained with a yield of better than 95% of theory when this anthracene is oxidized with nitric acid in nitrobenzene.

Using the identical procedure described above, crude carbazole can be purified, the pure carbazole remaining in the sulphuric acid layer and the impurities passing on to still C to be discarded.

It should be understood that the above example is illustrative only and that the invention is by no means limited to the exact procedure and conditions therein set out, but rather is susceptible to wide variation. Thus, the process is not limited to the use of anthracene of 50% purity but may be used with any grade of anthracene which contains carbazole. There is no objection in principle to using as low grade a product as 20% anthracene, dissolving it continuously in benzene and scrubbing this solution in sulphuric acid. I find it much more economical, though, when using such low grade anthracene to remove, prior to the scrubbing in sulphuric acid, part of the phenanthrene and other impurities which are more readily soluble in benzene or the like than are anthracene and carbazole. Thus, practically without loss of anthracene or carbazole, I was able to remove more than 50% of these impurities present in any anthracene by slurrying the crude anthracene in vessel A with benzene at 20°–30° C. for a short time and removing the benzene solution corresponding to the volume of vessel A to a separate still for solvent recovery. The preliminary removal of phenanthrene and other impurities improves the purity of the final product obtained in still C. It also removes materials from very low grade anthracene that might be sulphonated in 85% sulphuric acid at 20°–30° C.

The temperature in the acid scrubber B is preferably maintained between about 20° C. to about 30° C., and the temperature in the dissolver A should be about the same or not more than 10° C. higher than the temperature maintained in the acid scrubbers to avoid crystallization of the anthracene and carbazole from their solution. Although such a crystallization does not impair the efficiency of the purification, it is likely to cause mechanical difficulties.

I find that at 20°–30° C. a sulphuric acid of a strength of 80–86% is best suited for the removal of carbazole from benzene solutions of crude anthracene. Acid of higher concentration may be used but lower operating temperatures are required in such a case to avoid loss of yield due to sulphonation of the products. Lower operating temperatures also decrease the solubility of crude anthracene in solvents and consequently reduce the output of purified anthracene in a given equipment. A sulphuric acid of lower than 80% strength is less suitable for the conversion of carbazole to the solvent-insoluble carbazole sulphate and the purification of the crude anthracene becomes more and more inefficient as the acid strength decreases. Acid of about 70% strength is already completely ineffective. It was repeatedly determined that under the operating conditions outlined 80–86% sulphuric acid does not sulphonate anthracene, carbazole, the other impurities present in crude anthracene, or the solvent used. An acid concentration of 85% at a temperature of 20°–30° C. is to be preferred.

Sulphuric acid is of course not the only acid that can be used for the continuous extraction of carbazole from benzene solutions of crude anthracene. Any acid that will form a solvent-insoluble salt with carbazole and does not attack anthracene, the impurities present and the solvent employed, is equally suitable. Anhydrous hydrofluoric acid, for example, is equally as effective as sulphuric acid. The hydrofluoride of carbazole is formed which is insoluble in the solvent but readily soluble in the hydrofluoric acid.

My preferred solvent is benzene because it is cheap, low boiling, inert to cold sulphuric acid from which it separates readily, is a fair solvent for crude anthracene, is stable, and can readily be recovered. There are many solvents or mixtures of solvents with similar properties that can be used for this operation, for instance by-products obtained in some chemical process, like mixtures of benzene and hydrogenated benzene.

Difficulties leading to losses of solvents as encountered in the pyridine crystallization process are avoided because the separation of benzene from anthracene waxes and other impurities is easily accomplished.

The carbazole can be isolated by filtering the crystals of carbazole sulphate that precipitate during the purification, washing them with 85% sulphuric acid and decomposing them with hot water. The sulphuric acid may be diluted with water without first filtering the carbazole sulphate and the carbazole precipitated as the free base. Carbazole of a purity of 97-98% can readily be obtained. The efficiency of the removal of carbazole does not decrease during the extraction and the same acid can be used without adding more fresh acid than that removed with the carbazole sulphate.

This process removes carbazole to such an extent that the purified anthracene will not contain more than 1-2% carbazole calculated from the nitrogen content. The percentage of anthracene present in the purified product depends upon the quality of the crude anthracene, and upon the treatment it received prior to the acid scrubbing. It is obvious that a purified anthracene of a higher anthracene content will be obtained from a 50% crude than from a 25% crude anthracene, and a 50% crude anthracene that had been given a solvent wash will yield a purified anthracene of a higher anthracene content than is obtainable from an untreated material. Thus, I obtained a 76.3% anthracene containing 1.4% carbazole from a crude anthracene that contained 50% anthracene and 22% carbazole, or an 84.1% anthracene containing 1.18% carbazole from the same crude anthracene after it had been given a benzene wash.

The recovery of anthracene is invariably better than 95% of the amount of anthracene contained in the crude material. This indicates that losses due to sulphonation or any initial washes were practically negligible, especially when it is considered that analytical methods on crude anthracene containing much carbazole tend to give values that are too high.

There are, of course, a number of variations possible in the arrangement of the equipment that can be used without departing from the principle of continuous operations. Following are a few of the more obvious arrangements and refinements.

Dissolver A may be an agitated tank or a nonagitated vertical cylinder through which the benzene passes. Two or more of these dissolvers may be installed, facilitating the dissolving of the crude anthracene. A continuous centrifuge may be installed between a leaching tank and a dissolver and the anthracene slurry may be run through it prior to being dissolved.

Acid scrubber B may be a horizontal or vertical tank in which the sulphuric acid is slowly agitated. Several of these scrubbers may be installed in series or the scrubbing of the solvent solution may take place in a tall tower filled with Raschig rings or similar material and the acid and the benzene solution of crude anthracene be passed through this tower in countercurrent. During the process of pumping the acid to the top of such a tower it may be continuously filtered to remove the carbazole salt, and the acid thus removed may be replaced with fresh acid. The essential feature of the scrubbers B should be that they provide a good contact between the acid and the solution of crude anthracene.

The solvent solution of purified anthracene is likely to carry along small amounts of acid from the scrubbers and should therefore be neutralized and dried before entering the still.

The anthracene and phenanthrene are allowed to accumulate in the still until heavy crystallization sets in. The slurry of crystals can be transferred to another still to remove the solvent by distillation or to a crystallizer to allow it to cool. The crystals may be separated by filtration, for instance through a continuous centrifuge, and the filtrate may be returned to vessel A to be used for the initial dissolving of crude anthracene.

The above description is for purposes of illustration, it being understood that other modifications and variations coming within the spirit of the invention are to be included within the scope thereof as defined in the appended claims.

I claim:

1. A process for the separation of anthracene and carbazole from a mixture thereof which comprises the steps of continuously dissolving the mixture in a solvent therefor, continuously passing the solution so formed through a body of sulphuric acid of from substantially 80% to substantially 86% strength maintained at a temperature within the range of substantially 20° to substantially 30° C., whereby there occurs no substantial sulfonation of anthracene and carbazole and crystals of carbazole sulphate insoluble in the solvent are formed and separate from the solution, and continuously distilling the resulting solution of anthracene to recover pure anthracene therefrom, and continuously returning solvent to the dissolving stage of the process.

2. A process for the separation of anthracene and carbazole from a mixture thereof which comprises the steps of continuously dissolving the mixture in benzene, continuously passing the solution so formed through a body of sulphuric acid of from substantially 80% to substantially 86% strength, maintained at a temperature of substantially 20° C. to substantially 30° C., whereby there occurs no substantial sulfonation of anthracene and carbazole and crystals of carbazole sulphate insoluble in benzene are formed and separate from the solution, and continuously distilling the resulting solution of anthracene in benzene to recover pure anthracene therefrom, and continuously returning benzene to the dissolving stage of the process.

3. A process for the purification of crude anthracene containing carbazole as an impurity, which comprises the steps of continuously dissolving crude anthracene in benzene, continuously passing the solution through a body of sulphuric acid of substantially 85% strength maintained at a temperature between substantially 20° C. to substantially 30° C., whereby there occurs no substantial sulfonation of anthracene and carbazole and crystals of carbazole sulphate insoluble in benzene are formed and separate from the solution, and continuously distilling the resulting solution of anthracene in benzene to recover pure anthracene therefrom.

4. A process for the purification of crude anthracene containing carbazole as an impurity, which comprises the steps of continuously washing the crude anthracene with an organic solvent whereby the easily organic-solvent soluble impurities are removed, continuously dissolving the washed crude anthracene in benzene, continuously passing the solution through a body of sulphuric acid of substantially 80% to substantially 86% strength, maintained at a temperature between substantially 20° C. to substantially 30° C., whereby there occurs no substantial sulfonation of anthracene and carbazole and crystals of carbazole sulphate insoluble in benzene are formed and separate from the solution, and continuously distilling the resulting solution of anthracene in benzene to recover anthracene therefrom.

5. A process according to claim 4 wherein the solvent used to wash crude anthracene is benzene.

VIKTOR M. WEINMAYR.